June 7, 1966  F. BLAINE  3,254,641
MOUNTING AND TENSIONING DEVICE FOR ANNULAR SAWS
Filed May 29, 1963
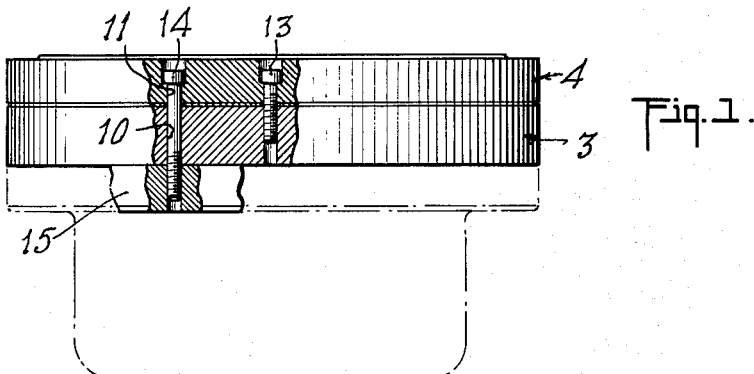
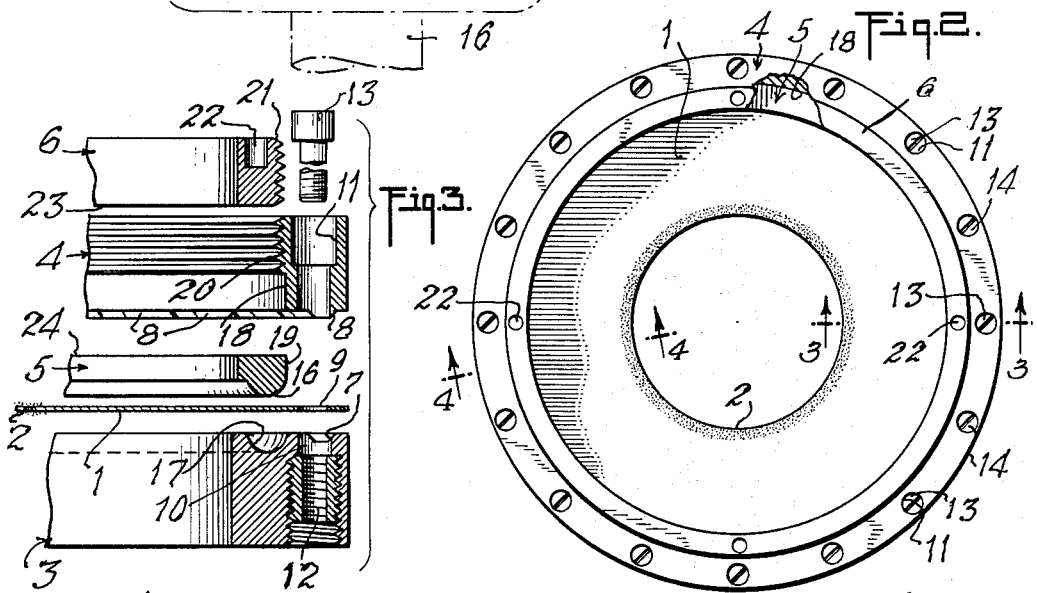
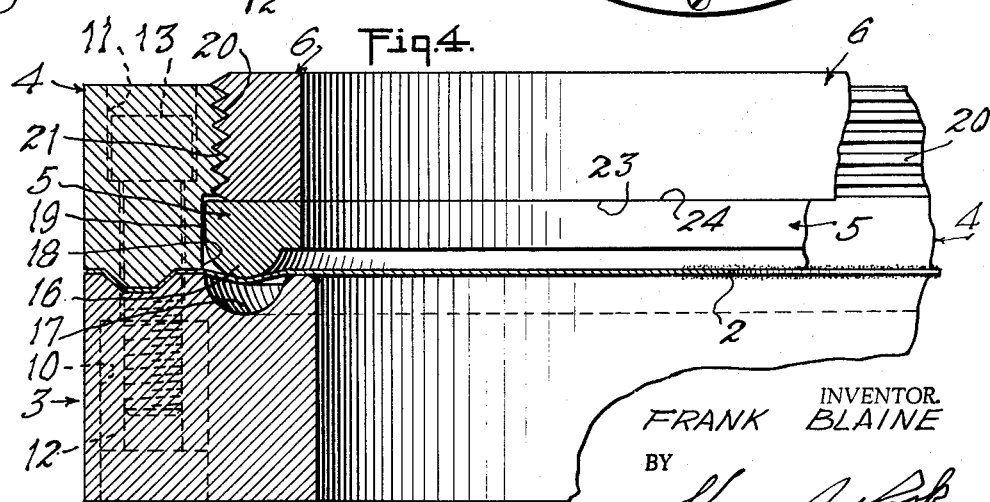
INVENTOR.
FRANK BLAINE
BY
ATTORNEY United States Patent Office 3,254,641
Patented June 7, 1966

1

3,254,641
MOUNTING AND TENSIONING DEVICE FOR ANNULAR SAWS
Frank Blaine, 158 Haddonfield Road, Clifton, N.J.
Filed May 29, 1963, Ser. No. 284,069
7 Claims. (Cl. 125—15)

This invention relates to a mounting and tensioning means for annular saws of the types that are utilized for cutting thin slices from hard and brittle materials such as quartz and germanium crystals.

An annular saw that is employed for such purposes generally comprises a thin metal disc mounted coaxially on a spindle so that the plane of the saw is perpendicular to the axis of rotation of spindle and the inner periphery of the circular disc comprises the cutting edge. Proper or effective operation of the saw requires that the saw be maintained under outward radial tension, and it is also desirable that such tension be variable or adjustable.

A primary object of the present invention is to provide novel and improved mounting and tensioning means for annular saws of the character described whereby the outward radial tension can be maintained in the saw and adjusted from time to time as may be necessary with a minimum tendency to distort or damage the saw.

Another object of the invention is to provide a mounting and tensioning device for annular saws, wherein there shall be clamping means for rigidly supporting the saw adjacent its outer periphery and adjusting means between the clamping means and the inner periphery of the saw including a part in contact with the saw and movable solely without rotation axially or in a direction parallel with the axis of the saw for adjustably applying outward raidal tension to the saw, so that there shall be a minimum of friction between said part and the saw that might score, cut into or otherwise damage or distort the saw.

Other objects, advantages and results will be brought out by the following description in conjunction with the accompanying drawings, in which FIGURE 1 is a side elevational view of a mounting and tensioning device for annular saws and a driving carrier therefor with portions of the mounting and tensioning device and of the carrier broken away and shown in the section and with other portions of the carrier shown by dot and dash lines;

FIGURE 2 is a top plan view thereof;

FIGURE 3 is an enlarged exploded fragmentary central vertical sectional view approximately on the plane of the line 3—3 of FIGURE 2 and;

FIGURE 4 is a further enlarged fragmentary vertical sectional view approximately on the plane of the line 4—4 of FIGURE 2.

Specifically describing the illustrated embodiment of the invention the annular saw is shown as comprising a flat annulus formed of a tin sheet of metal, for example, copper of a thickness of the order of .002 to .006 inch. The outer diameter of the saw may vary considerably, depending upon the purpose for which it is used and might be, for example, about 8 inches; and the inner diameter may also vary but may be, for example, about 3 inches where the outer diameter is about 8 inches. A suitable abrasive material is applied to the inner periphery 2 of the saw to provide a cutting edge.

The mounting and tensioning device is shown as comprising a base ring 3, all formed of suitable metal, a clamping ring 4, a presser ring 5 and an adjusting ring 6, such as steel.

The outer peripheral portion of the saw is clamped between the base ring 3 and the clamping ring 4, said rings having interengaging recesses and projections that are shown in the form of recesses 7 in the top face of the base ring and projections 8 on the bottom face of the

2 clamping ring 4. The outer peripheral portion of the saw is provided with a circular row of holes 9, each to be disposed in alignment or register with an opening 10 in the base ring and with a corresponding opening 11 in the clamping ring. Certain of the openings 10 have screw-threaded bushings 12 therein to coact with cap screws 13 for securing the two rings together, while the other openings 10 serve to receive elongated cap screws 14 for securing the mounting and tensioning device on a carrier 15 mounted coaxially on a driving spindle 16 which is adapted to be driven in known matter at the desired speed for rotating the saw.

In assembling the saw in the mounting and tensioning device, the saw is laid on the top face of the base ring 3 with each hole 9 in register with one of the openings 10 in the base ring and with the corresponding opening 11 in the clamping ring, whereupon a screw 13 is inserted through each of certain of the openings 11 and screwed into the clamping bushing 12 of the corresponding opening 10, so that upon tightening of the screws, the saw is firmly secured between the base ring and the clamping ring.

Outward radial tension is applied to the saw by the presser ring 5 that is slidably mounted in the clamping ring and has a circular bead or rib 16 on its bottom face to contact with the one side of the saw and directly opposite to and coaxial with a circular groove 17 in the top face of the base ring. Preferably the clamping ring has a cylindrical recess 18 extending coaxially inwardly of the ring from the bottom face thereof, and the presser ring 5 has an exterior cylindrical surface 19 freely slidably engaging the side wall of the recess 18 which serves as a guide for the presser ring as best shown in FIGURE 4. Extending from the bottom of the recess 18 through the top end of the clamping ring are screw-threads 20 of which coact with threads 21 on the outer peripheral surface of the adjusting ring 6. The adjusting ring is provided with suitable means to facilitate rotation of the ring relatively to the clamping ring. As shown, the adjusting ring is adjusted with a plurality of sockets 22 in its upper surface to receive a suitable wrench. The bottom surface 23 of the adjusting ring 6 is preferably flat in a plane perpendicular to the axis of the saw to slidably abut the smooth flat top surface 24 of the presser ring.

With this construction, and with the parts assembled as shown in FIGURES 1, 2 and 4, it will be seen that as the adjusting ring 6 is screwed into the clamping ring, it will abut the presser ring and slide the latter without rotation axially of the clamping ring and thereby press the bead 16 against the top surface of the saw so as to slightly bend the saw into the groove 17 of the base ring and thereby place the saw under outward radial tension. The tension can be increased by screwing of the adjusting ring further or tighter into the clamping ring toward the presser ring, and the tension can be reduced by unscrewing or loosening the adjusting ring in the clamping, that is by moving it away from the presser ring. This operation can be effected with a minimum of frictional engagement of the presser ring with the saw and consequently, with a minimum of scoring, or distortion of the saw. It will also be observed that this construction insures that the adjusting ring shall exert pressure on all portions on the presser ring and thereby on the saw at the same time, in contrast to known adjustments wherein independent adjustment of several screws is required for tensioning the saw. Furthermore, the adjustment of the saw tension is effected independently of the screws 14 which connect the mounting device to the carrier and of the screws 13 which connect the clamping ring to the base ring, respectively; and the saw tension can also be adjusted without in any manner affecting the rigid connection of the saw to the mounting device.

If desired the annular groove 17 could be formed in the presser ring, and the base ring 3 could have a rib thereon corresponding to the rib 16.

While the now preferred embodiment of the invention has been shown and described it will be understood by those skilled in the art that modifications and changes in the construction of the mounting and tensioning device can be made within the spirit and scope of the invention.

I claim:

1. A mounting and tensioning device for an annular saw provided with an inner peripheral cutting edge, comprising a base ring and a clamping ring and connecting means therefor for clamping the outer peripheral portion of the saw between them, a presser ring in and freely movable axially of said clamping ring toward and from said base ring, and having opposite faces one of which contacts said saw and adjusting means rotatably mounted and movable axially in said clamping ring for so moving the presser ring, said adjusting means and said presser ring having smooth surfaces to contact each other upon rotation and axial movement of said adjusting means said base ring and said presser ring having portions to coact on a saw clamped between said base ring and said clamping ring during said movement of said presser ring to place the saw under outward radial tension.

2. A mounting and tensioning device for an annular saw as defined in claim 1, wherein said presser ring is slidably mounted in said clamping ring.

3. A mounting and tensioning device for an annular saw as defined in claim 1, wherein said presser ring is slidably mounted in said clamping ring and said adjusting means is a ring screw-threaded in said clamping ring and relatively rotatably abuts said presser ring.

4. A mounting and tensioning device for an annular saw as set forth in claim 1, wherein said clamping ring has an inner peripheral cylindrical surface and said presser ring has an outer peripheral cylindrical surface freely slidably engaging said surface of the clamping ring.

5. A mounting and tensioning device for an annular saw as set forth in claim 1, wherein said clamping ring has an inner peripheral cylindrical surface and said presser ring has an outer peripheral cylindrical surface freely slidably engaging said surface of the clamping ring and said adjusting means is a ring screw threaded in said clamping ring.

6. The combination of an annular saw comprising a flat annulus of thin material having inherent resiliency and a cutting edge at its inner periphery, and a mounting and tensioning means therefor including a base ring, a clamping ring, means separably rigidly connecting said base ring and said clamping ring with the outer perimetral portion of said annulus rigidly clamped between them, a presser ring axially slidably mounted in said clamping ring to move toward and away from said annulus between said clamping ring and the cutting edge of the annulus, adjusting means rotatably and axially movable on said clamping ring for moving the presser ring into contact with the annulus and to exert pressure on the annulus, said adjusting means and said presser ring having smooth surfaces to contact each other upon rotation and axial movement of said adjusting means said base ring and said clamping ring having portions to coact on said annulus during said movement of the presser ring to place the saw under outward radial tension.

7. The combination as defined in claim 6 wherein said coacting portions of the base ring and the clamping ring are respectively an annular groove and an annular rib concentric with said cutting edge of the annulus.

References Cited by the Examiner

UNITED STATES PATENTS

| | | | |
|---|---|---|---|
| 2,517,056 | 8/1950 | Trubert | 92—104 |
| 2,942,624 | 6/1960 | Good | 92—104 |
| 3,039,235 | 6/1962 | Heinrich | 51—73 |

HAROLD D. WHITEHEAD, *Primary Examiner.*